United States Patent

Baldwin et al.

[11] 4,094,581
[45] June 13, 1978

[54] ELECTRO-OPTIC MODULATOR WITH COMPENSATION OF THERMALLY INDUCED BIREFRINGENCE

[75] Inventors: Gary D. Baldwin, Columbia; Stephen J. Bepko, Cockeysville, both of Md.

[73] Assignee: Westinghouse Electric Corp., Pittsburgh, Pa.

[21] Appl. No.: 763,764

[22] Filed: Jan. 31, 1977

[51] Int. Cl.² ............................................... G02F 1/03
[52] U.S. Cl. ..................................... 350/150; 350/157
[58] Field of Search ................................ 350/150, 157

[56] References Cited
U.S. PATENT DOCUMENTS

| | | | |
|---|---|---|---|
| 2,705,903 | 4/1955 | Marshall | 356/150 |
| 3,900,247 | 8/1975 | Zaky | 350/157 |

*Primary Examiner*—John K. Corbin
*Assistant Examiner*—R. A. Rosenberger
*Attorney, Agent, or Firm*—R. M. Trepp

[57] ABSTRACT

An electro-optic modulator for phase modulating a high power beam of monochromatic electro-magnetic radiation is described where localized phase distortion occurring within the beam due to thermal heating is compensated. The received radiation is passed through two precisely matched electro-optic crystals and an optical compensating element located between the two crystals. One of the crystals has an applied field for modulation purposes. With this arrangement, the thermal birefringent effects induced in the crystals are cancelled out with the output beam polarization properties determined by the input polarization, optical compensating element and applied electric field.

14 Claims, 3 Drawing Figures

ELECTRO-OPTIC MODULATOR WITH COMPENSATION OF THERMALLY INDUCED BIREFRINGENCE

BACKGROUND OF THE INVENTION

1. Field of the Invention

This invention relates to electro-optic modulators, particularly to electro-optic modulators utilizing electro-optic crystals.

2. Description of the Prior Art

Crystalline electro-optic modulators generally exhibit some optical absorption at all wavelengths. When a beam of light of sufficiently high average power passes through the modulator, significant heating of the crystal can result. The associated thermal distribution in the crystal produces strain-induced birefringence; the direction of the resultant strain axes and their birefringent effect on the phase of a transmitted optical beam is dependent on the crystal structure and the exact details of the intra-crystal temperature profile. In general, these thermally induced axes are physically oriented such that any phase retardation impressed on a linearly polarized input beam is a function of position within the beam cross-section. The non-uniform phase retardation can severely limit the modulation depth or extinction ratio for high power optical beams. In applications where the modulator is placed within a laser resonant cavity, the non-uniform phase retardation can severely limit the attainable extinction ratio from the laser and can produce exceptionally high losses if passed through a polarizer.

One example of the prior art is disclosed in U.S. Pat. No. 3.900,247 issued to S. G. Zaky on Aug. 19, 1975, entitled "Optical Modulator Having Compensation for Thermal and Space Charge Effects." Zaky shows optical radiation passing through an electro-optic crystal through a quarter wave plate to a mirror whereupon the radiation is reflected back through the quarter wave plate and through the electro-optic crystal. The mirror is spaced apart from the electro-optic crystal to provide a transit time to allow the modulated birefringence of the electro-optic crystal to be changed before the radiation passes back through the crystal. The 180° relative phase shift of the radiation due to the quarter wave plate and the mirror nullify any steady birefringence caused by thermal or space charge effects in the electro-optic crystal. Modulation of the radiation is obtained by changing the birefringence of the modulation element during the finite transit time of the modulator.

In view of the prior art, it is therefore desirable to thermally compensate an electro-optic modulator independent of transit time of the radiation through the modulator. It is desirable to thermally compensate electro-optic modulators wherein the radiation transmitted therethrough is of sufficient power to cause localized heating in the light transmitting materials of the modulator. In place of total compensation, it is desirable to provide partial compensation of the thermal birefringence in the electro-optic modulator to provide an improvement in the modulator performance. It is desirable that the thermally compensated electro-optic modulator is physically small. It is further desirable that the thermally compensated electro-optic modulator be useable within a laser resonant cavity.

SUMMARY OF THE INVENTION

In accordance with the present invention, a method and apparatus is provided for modulating electro-magnetic radiation which includes compensation for thermally induced birefringence comprising the steps of passing monochromatic radiation through a first electro-optic crystal having a predetermined crystalline structure and chemical composition, passing radiation exiting from said first electro-optic crystal through an optical compensating element having specific phase retardation properties, passing radiation exiting from said optical compensating element through a second electro-optic crystal having a predetermined crystaline structure and chemical composition, generating a modulation signal, and generating an electric field across said second crystal in response to said modulation signal.

DESCRIPTION OF THE PREFERRED EMBODIMENTS

Figure 1:
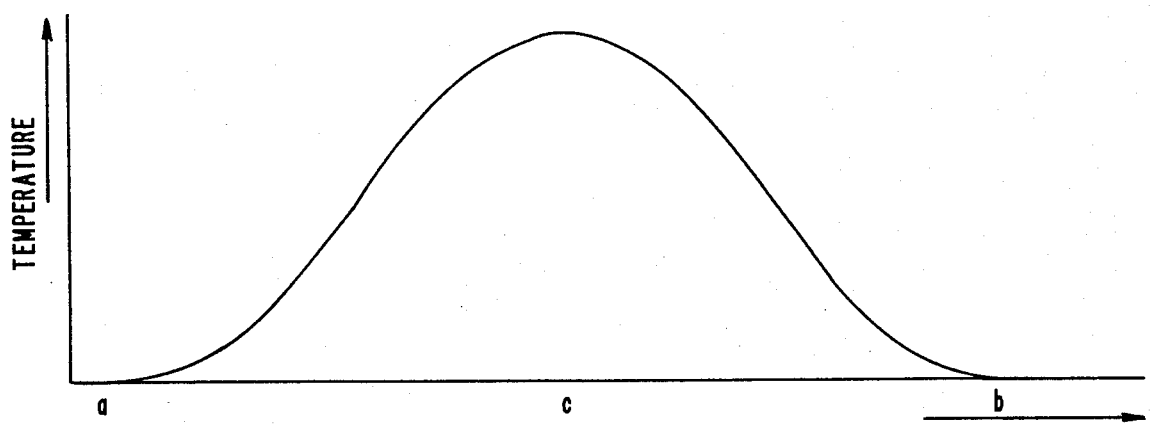
FIG. 1 is a graph showing the typical temperature in electro-optic material when passing or transmitting a high energy beam of light.

Referring to FIG. 1, a curve shows the typical thermal distribution in a crystal from optical absorption when a beam of electro-magnetic radiation of sufficiently high average power passes through. The ordinate represents the temperature of the crystalline material 10 and the abscissa represents distance along a line ab across the crystalline material 10 shown in FIG. 2. The thermal distribution in the crystal produces strain induced birefringence which causes the speed of radiation passing through the material 10 to vary as a function of position within and across the material. The speed of radiation or velocity of light is inversely proportional to the index of refraction $n$. If the original index of refraction $n_0$ is measured for the unstressed crystalline material, then the index of refraction at a particular point in a particular direction under thermal stress or strain is $n_o + \Delta n$ where $\Delta n$ may be positive or negative and is representative of the change in the index of refraction. For a more detailed description of birefringence and the effects of stress on the index of refraction, reference is made to a publication by Prentiss-Hall, Inc., Englewood Cliffs, N.J., entitled "Introduction to Photo Mechanics" by A. J. Durelli and W. F. Riley, chapters 1 and 3, published in 1965, which is incorporated herein by reference. The curve in FIG. 1, for example, represents the temperature taken along the line ab on the surface 14 of electro-optic crystal 10 with radiation 12 in the form of a beam of radiation having some diameter and having its center point incident upon the surface 14 of electro-optic crystal 10 at point C. As can be seen in FIG. 1, point C has the highest temperature due to the optical absorption of a portion of radiation 12. Other temperature profiles are possible depending on the distribution of energy in radiation beam 12 and the thermal boundary conditions of the crystal.

Figure 2:
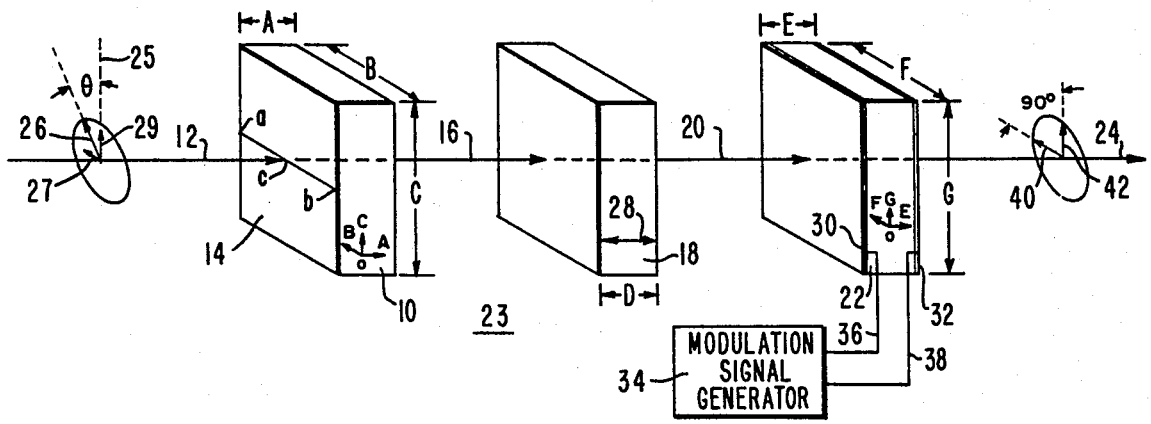
FIG. 2 is a block diagram of one embodiment of the invention.

Referring to FIG. 2, radiation 12 passes through electro-optic crystal 10. Radiation 16 exiting from electro-optic crystal 10 passes through optical compensating element 18. Radiation 20 exiting from optical compensating element 18 passes through electro-optic crystal 22. The output beam or radiation 24 exiting from electro-optic crystal 22 provides the output of the electro-optic modulator 23. Radiation 12 for example may be monochromatic light which may be linearly or plane polarized having an E field $E_O$ in the direction of vector 26 at an angle 0 with respect to reference line 25. Radiation 12 may be a beam of light, for example, ultraviolet, visible, or infrared having a cross-section with non-uniformity of intensity of light across the diameter of the beam. Electro-optic crystal 10 has a predetermined crystalline structure and principal axes OA, OB and OC which are fixed with respect to the crystalline structure. In FIG. 2, axes OB and OC are orthogonal to radiation 12 and axis OA is parallel. Electro-optic crystal 10 also has a predetermined chemical composition, for example, potassium dihydrogen phosphate, or an isomorph of potassium dihydrogen phosphate such as potassium dideuterium phosphate. Other materials which may be suitable for electro-optic crystal 10 may be, for example, lithium niobate and its isomorphs and cesium dihydrogen arsenate and its isomorphs. Electro-optic crystal 10 may have a predetermined size such as a rectangular plate having a depth A, a width B and a height C, as shown in FIG. 2. Electro-optic crystal 10 functions to provide thermally induced birefringence to radiation 12 as it passes through electro-optical crystal 10. The thermally induced birefringence is caused by the optical absorption of some of the energy of radiation 12 as it passes through electro-optic crystal 10. The variation in temperatures across the cross-section of crystalline material 10 as radiation 12 passes through causes strain or strain axes within the electro-optic crystal 10 which in turn results in a variation of the index of refraction also known as thermally induced birefringence.

Optical compensating element 18 has specific phase retardation properties and functions to rotate each point in radiation 16 by a predetermined angle; for best results the rotary power of element 18 should be 90°. Optical compensating element 18 has the effect of rotating the strain axes of electro-optic crystal 10 90° with respect to electro-optic crystal 22. Optical compensating element 18 may, for example, be an optical rotator with a rotary power of 90°. One example of an optical rotator is crystalline quartz having a thickness D shown in FIG. 2 which may be in the neighborhood of 15 millimeters to provide a 90° rotation for light. The thickness D for 90° rotation is dependent upon the wavelength of radiation 16. It is understood that radiation 16 should be extremely well collimated for a rotator such as quartz to provide rotation of each point in the cross-section of radiation 16. In the case of a quartz rotator, radiation 16 should be parallel with optic axis 28 of optical compensating element 18. Radiation 20 exiting from optical compensating element 18 therefore has each point in the cross-section of radiation 20 rotated 90° or at some predetermined angle relative to the corresponding point in the cross-section of radiation 16.

Elecro-optic crystal 22 has a predetermined crystalline structure and principal axes OF, OG and OE which are affixed by the crystalline structure and shown in FIG. 2. In FIG. 2, axes OF and OG are orthogonal to radiation 20 and axis OE is parallel. The chemical composition of electro-optic crystal 22 may be one of those previously mentioned as suitable for electro-optic crystal 10. It is desirable that the chemical composition of electro-optic crystal 22 be the same as electro-optic crystal 10 in that the strain in crystal 22 point by point due to thermal temperature variations is identical or similar to electro-optic crystal 10. Electro-optic crystal 22 may, for example, be a plate having a depth E, a width F and a height G as shown FIG. 2.

Electro-optic crystal 22 may have a transparent electrode 30 on the surface facing radiation 20 and a transparent electrode 32 on the opposite surface from electrode 30 to provide an electric field across the electro-optic crystal 22. As shown in FIG. 2, the electric field is considered longitudinal with respect to radiation 20. Another embodiment may have the electrodes positioned to provide a transverse electric field across electro-optic crystal 22 and with respect to radiation 20, which is conventional in the art. Modulation signal generator 34 provides a modulation signal over line 36 to electrode 30 and over line 38 to electrode 32. The modulation signal generator 34, electro-optic crystal 22 and electrodes 30 and 32 are conventional in the art as a prior art electro-optic modulator. The electric field across electro-optic crystal 22 varies as a function of the modulation signal over lines 36 and 38 from modulation signal generator 34. Radiation 24 is therefore modulated in accordance with the modulation signal from modulation signal generator 34. Electro-optic crystal 22 and electrode 30 and 32 is known in the art as a Pockels cell.

If every point in radiation 20 is rotated 90° with respect to the corresponding point in radiation 16, then the strain axes due to temperature variations in electro-optic crystal 22 will provide corresponding phase variations to radiation 20 as electro-optic crystal 10 did to radiation 12 except that the electric field of radiation 20 is rotated 90° by optical compensating element 18. For this embodiment the principal axes OB should be parallel with OF, OC should be parallel with OG and OA should be parallel with OE of electro-optic crytals 10 and 22 respectively. In other words, radiation 12 experiences one index of refraction in the direction OC and another index of refraction in the direction OB at each point in the cross-section of radiation 12. Radiation 20 will experience one index of refraction in the direction OF and another index of refraction in the direction OG b electro-optic crystal 22 at every point in the cross-section of radiation 20. A particular point in the cross-section of radiation 12 will experience the combination of the index of refraction of OB and OG for one orthogonal component in radiation 24 and OC and OF for the other orthogonal component in radiation 24. If the sum of the index of refractions in the directions OB and OG equals the sum of the index of refractions in the directions OC and OF, then both orthogonal components of radiation 24 will have experienced the same index of refraction history resulting in complete compensation of the thermally induced birefringence. It is desirable in order to provide complete compensation that the principal axes of electro-optic crystal 10 are parallel with the principal axes of electro-optic crystal 22. Furthermore, for complete compensation it is desirable that the electro-optic crystals are precisely matched in all critical parameters such as material composition, physical dimensions, optical absorption, external thermal environment and thermal boundary conditions. With complete compensation the polarization properties of output radiation 24 are determined by the input polarization of radiation 12, the rotary power of optical compensating element 18 and the electric field across electro-optic crystal 22 in response to the modulation signal.

It is understood that the embodiment in FIG. 2 would operate just as well if electrodes 30 and 32 were attached to electro-optic crystal 10 in place of their attachment to electro-optic crystal 22. In other words, electro-optic crystal 10 may perform the modulation while electro-optic crystal 22 would be a blank crystal. In addition, the embodiment of FIG. 2 would work just as well if the direction of radiation was reversed as that shown by the arrows where input radiation 12 would enter electro-optic crystal 22 and radiation 16 would exit from electro-optic crystal 22 and radiation 20 would exit from optical compensating element 18 and radiations 24 would exit from electro-optic crystal 10. It is further understood that the embodiment of FIG. 2 would be operable inside a resonant laser cavity.

Figure 3:
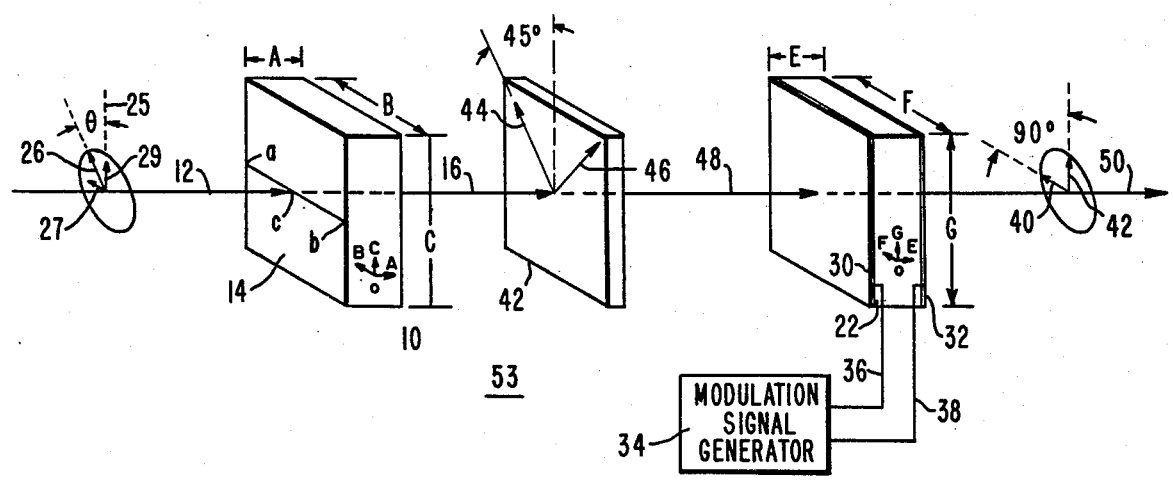
FIG. 3 is a block diagram of an alternate embodiment of the invention.

Referring to FIG. 3 an alternate embodiment of the invention is shown. In FIG. 3 like references are used for functions corresponding to the embodiment of FIG. 2. In FIG. 3 optical compensating element 18 is implemented with a half-wave retardation plate in place of the 90° polarization rotator. The fast axis 44 and slow axis 46 of the half-wave retardation plate 42 should be oriented at 45° to the principal axes OB and OC of electro-optic crystal 10 for maximum effectiveness. Points in the cross-section of radiation beam 16 that are 45° with respect to the fast axis 44 or the slow axis 46 will be rotated 90°. Points in radiation 16 that are at lesser angles than 45° will be rotated by a lesser amount. The half-wave plate 42 can be made thin so that the optical absorption within the plate and subsequent heating is negligible. Furthermore, the acceptance angle requirements for achieving a uniform phase retardation across the beam diameter of radiation 16 are considerably less stringent for half-wave plate 42 than for a 90° rotator. Radiation 48 exiting from half-wave plate 42 passes through electro-optic crystal 22 where those portions of radiation 48 that were rotated 90° is compensated in electro-optic crystal 22 by the index of refraction along the principle axes OF and OG. Radiation 50 is the output of the electro-optic modulator 53 with compenstion for thermally induced birefringence for radiation that is 45° off axis with respect to the fast and slow axes of the half-wave plate 42. Radiation at other angles will be compensated, but to a lesser extent due to the fact that the rotation will not be 90°. As in FIG. 2, the position of electro-optic crystal 22 may be interchanged with electro-optic crystal 10 or the direction of radiation may be reversed and enter first electro-optic crystal 22, then half-wave plate 42 and electro-optic crystal 10.

The invention provides a method and apparatus for modulating electro-magnetic radiation which includes compensation for thermally induced birefringence comprising the steps of passing monochromatic radiation through a first electro-optic crystal having a predetermined crystalline structure and chemical composition, passing radiation exiting from said first electro-optic crystal through an optical compensating element having rotary power, passing radiation exiting from said optical compensating element through a second electro-optic crystal having a predetermined crystalline structure and chemical composition, generating a modulation signal, and generating an electric field across said second crystal in response to said modulation signal.

We claim:

1. A method for modulating radiation which includes compensation for thermally induced birefringence comprising the steps of:
passing monochromatic radiation through a first electro-optic crystal having a predetermined crystalline structure and chemical composition,
passing radiation exiting from said first electro-optic crystal through an optical compensating element having rotatory power,
passing radiation exiting from said optical compensating element through a second electro-optic crystal having a prdetermined crystalline structure and chemical composition,
generating a modulation signal, and
generating an electric field across said second crystal in response to said modulation signal.

2. An electro-optic modulator for modulating radiation which includes compensation for thermally induced birefringence comprising:
a first electro-optic crystal having a predetermined crystalline structure and chemical composition,
means for generating a modulation signal,
means for generating an electric field across said first crystal in response to said modulation signal,
an optical compensating element with rotatory power, and
a second electro-optic crystal having a predetermined crystalline structure and chemical composition,
said second electro-optic crystal, optical compensator, and first electro-optic crystal arranged in radiation transmitting relationship with said optical compensating element receiving radiation exiting from one of said electro-optic crystals and passing radiation into said other electro-optic crystal.

3. The electro-optic modulator of claim 2 wherein said optical compensating element is quartz.

4. The electro-optic modulator of claim 2 wherein said optical compensating element has a rotatory power of 90° at a predetermined wavelength.

5. The electro-optic modulator of claim 2 wherein said first and second electro-optic crystals have principal axes fixed by its respective crystalline structure and wherein said principal axes of said first crystal are parallel to the principal axes of said second crystal.

6. The electro-optic modulator of claim 5 wherein said optical compensating element includes a half-wave plate having a fast and slow axis angularly oriented 45° with respect to the principal axes of said first and second crystals which are orthogonal to said radiation transmitting relationship.

7. The electro-optic modulator of claim 2 wherein the chemical composition of said first and second electro-optic crystals comprises potassium dihydrogen phosphate.

8. The electro-optic modulator of claim 2 wherein said chemical composition of said first and second electro-optic crystals comprises an isomorph of potassium dihydrogen phosphate.

9. The electro-optic modulator of claim 2 wherein said optical compensating element includes a half-wave plate.

10. The electro-optic modulator of claim 2 wherein the crystalline structure of said first and second electro-optic crystals are the same.

11. The electro-optic modulator of claim 2 wherein said radiation is in the form of light.

12. An electro-optic modulator for modulating radiation which includes partial compensation for thermally induced birefringence comprising:
a first electro-optic crystal having a predetermined crystalline structure and chemical composition, means for generating a modulation signal, means for generating an electric field across said first crystal in response to said modulation signal, an optical compensating element having predetermined phase retardation properties, and a second electro-optic crystal having a predetermined crystalline structure and chemical composition, said second electro-optic crystal, optical compensator, and first electro-optic crystal arranged in radiation transmitting relationship with said optical compensating element receiving radiation exiting from one of said electro-optic crystals and passing radiation into said other electro-optic crystal.

13. The electro-optic modulator of claim 12 wherein said optical compensating element includes a half-wave plate.

14. A method for modulating electro-magnetic radiation which includes compensation for thermally induced birefringence comprising the steps of:

passing monochromatic radiation through a first electro-optic crystal having a prdetermined crystalline structure and chemical composition, passing radiation exiting from said first electro-optic crystal through an optical compensating element having prdetermined phase retardation properties, passing radiation exiting from said optical compensating element through a second electro-optic crystal having a predetermined crystalline structure and chemical composition, generating a modulation signal, and generating an electric field across said second crystal in response to said modulation signal.

* * * * *